US008655638B2

(12) United States Patent
Stadel

(10) Patent No.: US 8,655,638 B2
(45) Date of Patent: Feb. 18, 2014

(54) METHODS FOR CONVERTING INSTRUCTIONS WITH BASE REGISTER-RELATIVE ADDRESSING IN AN EMULATION

(75) Inventor: Manfred Stadel, Munich (DE)

(73) Assignee: Fujitsu Technology Solutions Intellectual Property GmbH (DE)

( * ) Notice: Subject to any disclaimer, the term of this patent is extended or adjusted under 35 U.S.C. 154(b) by 518 days.

(21) Appl. No.: 13/044,832

(22) Filed: Mar. 10, 2011

(65) Prior Publication Data

US 2011/0231179 A1 Sep. 22, 2011

(30) Foreign Application Priority Data

Mar. 16, 2010 (DE) .......................... 10 2010 011 583

(51) Int. Cl.
*G06F 9/455* (2006.01)

(52) U.S. Cl.
USPC .......................................................... 703/26

(58) Field of Classification Search
USPC .......................................................... 703/26
See application file for complete search history.

(56) References Cited

U.S. PATENT DOCUMENTS

| 5,790,443 | A | 8/1998 | Shen et al. |
| 5,918,252 | A | 6/1999 | Chen et al. |
| 6,408,382 | B1 * | 6/2002 | Pechanek et al. ............. 712/227 |
| 6,571,206 | B1 * | 5/2003 | Casano et al. .................. 703/25 |

* cited by examiner

*Primary Examiner* — Saif Alhija
(74) *Attorney, Agent, or Firm* — DLA Piper LLP (US)

(57) ABSTRACT

An original processor uses addresses with a first length of n bits for addressing in a cyclical address space and a target processor uses addresses with a second length of m bits, where the second length m is greater than the first length n. In the original processor, distance values that lie between a lower value min and an upper value max are permissible for the base register-relative addressing. The supported address space on the original processor for the code to be emulated is limited in such a manner that the conversion of address operands as described in the following steps leads to semantically equivalent behavior on the target processor. A projected address on the target processor is initially determined by forming the sum of the content of the base register (R) and an offset (D) that is greater than or equal to a first offset ($D_1$) of a base register-relative instruction and less than the difference (max−min), and projecting the sum onto a cyclical address space with addresses having a length of n bits. Addresses for converting the base register-relative instructions are determined from the calculated projected address and the respective distance values ($D_1$, $D_2$) of the instructions minus the offset D.

12 Claims, 5 Drawing Sheets

METHODS FOR CONVERTING INSTRUCTIONS WITH BASE REGISTER-RELATIVE ADDRESSING IN AN EMULATION

RELATED APPLICATION

This application claims priority of German Patent Application No. 10 2010 011 583.5, filed Mar. 16, 2010, herein incorporated by reference.

TECHNICAL FIELD

This disclosure relates to methods for converting at least two instructions with base register-relative addressing in an emulation on a target processor of a program created for an original processor, wherein the original processor uses addresses of a first length of n bits for addressing in a cyclical address space, and the target processor uses addresses with a length of m bits for addressing, where m is greater than n.

BACKGROUND

When newer processor systems and architectures are introduced, it is desirable to be able to continue to use programs developed for older processor systems. For this purpose, emulators are used, which imitate older processor systems on the newer ones, and make it possible to execute program code created for an older processor, also called original processor, on the newer one, also called target processor. Emulators are typically themselves programs run on the target processor and dynamically transform instruction sequences for the original processor into instruction sequences for the target processor to then efficiently run them directly on the target processor.

As part of the translation of the instructions, address operators of instructions, e.g., load instructions and jump instructions must be correctly translated. In an addressing method provided in many processor architectures and frequently used, an address is defined by the specification of a base register and an offset. The address is calculated at run time as the sum of the content of the specified base register and the offset. Instructions using this addressing method are also called "instructions with base register-relative addressing." For conciseness, the term "base register-relative instruction" is also common.

The address space reachable by such a base-register relative instruction is frequently smaller than the maximum addressable address space based on the bit width of the register. S/390 processors from IBM, for example, have an available bit width of 32 bits. An address space with addresses of 24 bit or 31 bits long can be selected so that the possible address space comprises a range from 0 to $2^{24}-1$ or from 0 to $2^{31}-1$. The address space is also configured cyclically in such a manner that calculated addresses that reach past the edge of the address space are wrapped around and onto the address space. This can be done, for example, by dividing the address that results from the content of the address register plus the offset by the size of the address space and using the remainder resulting from this division, which then lies in the address space, as the effective address. Such a calculation is referred to as a modulo operation or a wrap-around calculation.

Due to the generally larger addressing widths of newer processor architectures, newer processors do not necessarily support the smaller address spaces of older processor systems. Different-sized address spaces can be problematic for the emulation of program code, however. A calculated address for a load or jump instruction, for example, that lies outside the address space of the original processor, but can be represented in the larger address space of the target processor, differs in the emulated program from the effective address determined taking into account the wrap-around on the original processor. To nevertheless calculate the address correctly in an emulation, it is necessary to insert additional instructions into the translated program code, by which the smaller size of the address space in the original processor is taken into account. This can be done, for instance, by first determining the address in a temporary register as the sum of the content of the base register and the offset in a first instruction and, in a second instruction, then emulating the wrap-around into a smaller address space by using an operation of the modulo $2^n$ type, where n indicates the length of the addresses in the smaller address space of the original processor. Then a jump or a data access can be executed via the address in the temporary register. The base register-relative instruction is indeed emulated semantically correctly in this manner, but the emulation requires two additional program instructions for each instruction, whereby it is slowed down.

A method and a device for generating a modulo address to access a ring buffer is disclosed in U.S. Pat. No. 5,918,252. As inputs, the method and the device take a length of the ring buffer, a current address of the ring buffer and a distance between the current address and the next address to be generated. During operation, the current address is decomposed into a base address and a distance relative to the base access.

A unit for generating mixed modulo addresses with several inputs is disclosed in U.S. Pat. No. 5,790,443. That unit effectively adds a subset of these inputs to a reduced modulo, while other inputs are simultaneously added in a full modulo to the partial sum of the reduced-modulo inputs.

It could therefore be helpful to provide methods for converting base register-relative instructions in an emulation with which the different sizes of the address spaces of the original and the target processor are correctly taken into account and which simultaneously allows an effective emulation with as few additional instructions as possible.

SUMMARY

I provide a method for converting at least two instructions with base register-relative addressing in an emulation of a program code created for an original processor into a program code for a target processor, wherein the original processor uses addresses with a length of n bits in a cyclical address space, the target processor uses addresses with a length of m bits, where m is greater than n, the target processor allows a base register-relative addressing with distance values that lie between a lower value (min) and an upper value (max), and the supported address space on the original processor for the code to be emulated is limited in such a manner that the conversion of address operands as described in the following steps leads to semantically equivalent behavior on the target processor including converting a first instruction for the original processor with an address operand that results from a first offset ($D_1$) relative to a base register (R), by: determining a projected address on the target processor by forming the sum of the content of the base register (R) and an offset (D) that is greater than or equal to the first offset ($D_1$) and less than the difference (max−min), and projecting the sum onto a cyclical address space with addresses having a length of n bits, determining a first address on the target processor as the sum of the projected address and the first offset ($D_1$), minus the offset (D) and executing a converted first instruction on the target processor with the first address as the address operand; and converting a second instruction for the original processor with an address operand that results from a second offset ($D_2$) relative to a base register (R), by: determining a second address on the target processor as the sum of the projected address and the second offset ($D_2$), minus the offset (D) and executing a converted second instruction on the target processor with the second address as the address operand.

I also provide a program for emulation of a program created for an original processor on a target processor that performs the method while running on the target processor.

DETAILED DESCRIPTION

Figure 1:
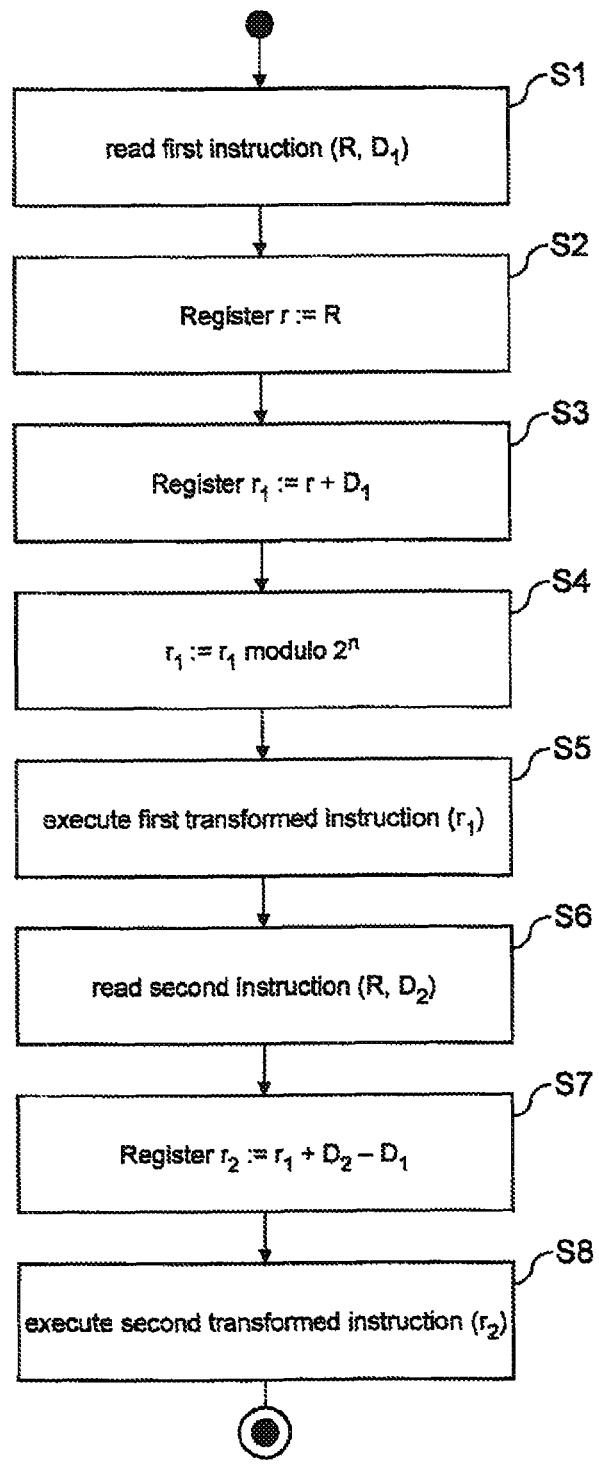
FIG. 1 is a flow chart of a method for converting two instructions with base register-relative addressing.

The method will be explained in detail below with reference to examples and figures.

In the following description of figures, base registers of the original processor are marked with an R as reference number and registers of the target processor with an r. An index can be used to distinguish different registers $r_i$. For the sake of simplicity, the reference symbols R, r designate both the respective register and, in formulas or calculations, the respective register contents. Distance values for the original or target processor bear a D or d, respectively, as a reference character. Different distance values are distinguished by specifying an index, e.g. $D_1$, $D_2$.

An expression in brackets designates the determination, performed automatically by a respective processor, of an effective address for the address specified by the expression. The length of an address in the respective address space for which the effective address is calculated can be indicated at the bracket in such a case. The expression $[2^{16}+5]^{n=16}$ accordingly means that the address value $2^{16}+5$ is converted into an effective address in a 16 bit-wide cyclical address space. Therefore a wraparound takes place in the indicated example case, so that the specified expression leads to an effective address of 5.

FIG. 1 shows a flow chart of a first example of a method for converting instructions with base register-relative addressing. The method shown is executed as part of an emulation on a target processor of a program code that was prepared for an original processor. The emulation can convert the instructions in the original program code individually in succession into program code for the target processor and directly execute them (interpretation). To accelerate the emulation, particularly if a multiple execution of program components is expected, as for loop structures, for example, there can be a dynamic translation of at least parts of the program code. In this case, frequently executed parts of the original program are translated dynamically, i.e., during the emulation, stored in the working memory of the target processor and finally executed directly on the target processor under the control of the emulator, multiple times if necessary.

The original and the target processors have different-sized address spaces. For a simplified indication of the size of address spaces, the term width or bit width will be used below not only for registers, but also for address spaces. An address space with a width of n bits means that addresses with a length of n can be used for addressing in that address space. In all of the following examples, the original processor has an address space with a width of n bits and the target processor has an address space with a width of m bits, where m is greater than n. Additionally, the address space of the original processor is cyclical. The address space of the target processor can be cyclical, but need not be. The more common case will be assumed below, in which the second address space is likewise cyclical.

In the first step S1, a first base register-relative instruction in the original program code with the base register R and the offset $D_1$ is read in. To convert this instruction for execution on the target processor, a register r with the contents of the base register R is created in a second step S2. This register r thus tracks the base register R. The base register R is generally not changed inside of a program. Step S2 is therefore necessary only one time during the emulation of a program, typically in connection with the first base register-relative instruction.

In a subsequent step S3, the sum of the content of the register r and the offset $D_1$ of the instruction read in step S1 is formed and assigned to a register $r_1$ of the target processor. Alternatively to the simple summation $r+D_1$ shown in the flow chart, the contents of the register $r_1$ can also be calculated as the effective address in the m-bit wide address space of the target processor, i.e., as $[r+D_1]^m$. Especially if the second address space is also cyclically configured, there are usually special processor instructions available for loading a register with an effective address value.

In the subsequent step S4, the contents of the register $r_1$ are projected onto an address space with an address length of n, i.e., an address space with the size of the original processor. This projection is done by taking the remainder of a division by the value $2^n$, which is generally referred to as a modulo operation.

In a subsequent step S5, the emulated first instruction with the projected address determined in the steps S3 and S4 is executed on the target processor as an instruction with indirect addressing via the register $r_1$.

In the further course of the emulation, a second base register-relative instruction from the program code of the original processor is read in step S6. This second instruction is again relative to the base register R, of which it is additionally assumed that its content has not changed since step S1, and with an offset $D_2$.

In a subsequent step S7, a second instruction is formed as the sum of the projected address still stored in the register $r_1$ and the second offset $D_2$ minus the first offset $D_1$. The thus-calculated second address is stored in a register $r_2$. As in step S3, the contents of the second register $r_2$ can be taken as the effective address in the m-bit wide address space of the target processor.

Finally, in a subsequent step S8, the emulated second instruction with the emulated second address, which is stored in the register $r_2$, is executed as an instruction with indirect addressing.

In the description of FIG. 1, it is assumed that the translated instruction sequences are immediately executed in an interpretation mode. As already indicated, it is alternatively equally possible to perform the translation and initially store up the acquired program code to be able to subsequently execute it singly or preferably multiple times without retranslation or interpretation (dynamic translation).

In comparison to known methods in which the (smaller) bit width of the address space of the original processor must be taken into account by an addition and the use of the modulo operation for each base register-relative instruction, this need only be done in the method presented here in the translation of the first instruction (steps S3 and S4). The effective address for the second instruction is determined with only a simple addition (step S7). The execution time of the emulation is reduced by the saving of the modulo operation. This is particularly true if the second instruction is to be executed multiple times due to a loop, or if additional instructions follow in the original program code whose effective address can be determined analogously to that of the second instruction.

For the distance values D in instructions with base register-relative addressing in the original processor, there is typically a limited value range available, the size of which is often considerably smaller than that of the address space. If the boundaries of the permitted value range are specified with min and max, the result is min≤D≤max. For a model S/390 processor from IBM, for example, the value range is 0≤D≤4095 (12 bits).

The second instruction in step S8 can be realized especially effectively on the target processor as a base register-relative instruction with the register $r_1$ as the base and the difference $d=(D_2-D_1)$ from step S7 as the offset. By taking the difference in this way, negative values for the offset d can also appear. It is consequently a prerequisite for the illustrated method that the target processor allows negative values for the base register-relative jumps, in particular in a range of min−max≤d≤max−min. This condition is met in most modern processors, such as the processors of the x86 series from Intel, which allow distance values in the range $-2^{31} \le d \le 2^{31}-1$ without restriction.

The illustrated method additionally requires that, of the actual address space of the original processor with addresses from 0 to $2^n-1$, only addresses in the range from 0 to $2^n-1-$(max−min) be used by the emulated program. Such a restriction can be achieved by a convention according to which the address space used by application programs is correspondingly limited. Another possibility is the use of system programs by which this restriction is specified or monitored.

Without the restrictions, there would be an erroneous calculation for addresses in the excluded range, since a wrap-around would already occur in the original processor but not in the target processor. However, since the difference (max−min) is usually much smaller than the size of the address space, $2^n$, this is not a disadvantageous restriction in practice. In the IBM System S/390 previously mentioned as an example, (max−min) is $2^{12}$ bytes=4 kB (kilobytes). By contrast, the size of the supported address space is $2^{24}$ bytes=16 MB (megabytes) or $2^{31}$ bytes=2 GB (gigabytes). Of the address space on this order of magnitude that was originally available, only a range of 4 kB is no longer accessible to application programs. This upper memory area of an address space is also usually reserved for the operating system and cannot be used by application programs in any case. My methods takes advantage of this.

Under the prerequisite of the limited address space, the effective address calculated in step S3 must lie in the range of $0 \le r_1 \le 2^n-1-$(max−min) for a successful memory access. It is assumed that an effective address is calculated in step S7, i.e., $r_2=[D_2-D_1+r_1]=D_2-D_1+r_1$ modulo $2^m$. To verify that the translation of the address operands correctly emulates the semantics of the original processor, the following cases are distinguished:

a) $0 \le D_2-D_1+r_1 \le 2^n-1-$(max−min):
the original processor calculates the effective address modulo $2^n$, and the target processor modulo $2^m$. Since $D_2-D_1+r_1 < 2^n < 2^m$, both processors calculate the same effective address, namely $D_2-D_1+r_1$.

b) $D_2-D_1+r_1 < 0$:
the original processor calculates the effective address as $2^n+D_2-D_1+r_1 \ge 2^n+$max−min. This lies outside the limited address space, so that the original processor would interrupt the execution due to addressing errors. The target processor calculates the effective address as $2^m+D_2-D_1+r_1 \ge 2^n+$max−min. This likewise lies outside the limited address space, so that the original processor would also interrupt the execution due to addressing errors. Both processors thus react identically with an interrupt due to an addressing error. If the original processor provides the effective address that caused the addressing error in a special register for interrupt processing, the emulation on the target processor must correct this effective address f that led to the error by modulo $2^n$ before calling the interrupt processing.

c) $D_2-D_1+r_1 > 2^n-1-$(max−min):
due to the restrictions for $r_1$, $D_1$ and $D_2$, it holds that $2^n > D_2-D_1+r_1$, so that both processors calculate the same effective address, namely $D_2-D_1+r_1$. It lies outside the limited address space, however, so that both processors interrupt the program execution due to addressing errors.

It has thus been shown that the translation of the address operands in this case precisely emulates the semantics of the original processor on the target processor.

Figure 2:
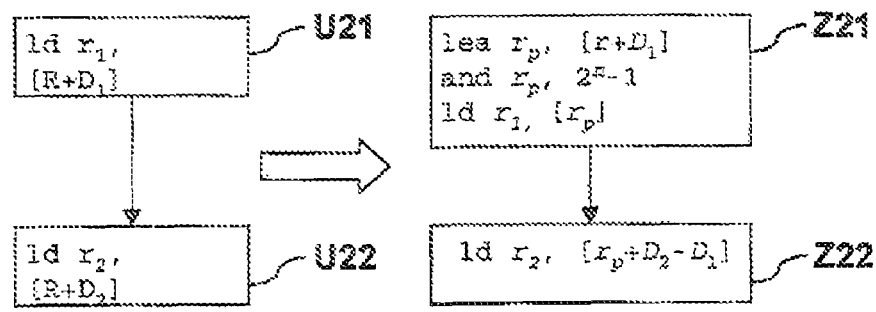
FIG. 2 is a pseudocode representation of the method shown in FIG. 1.

The method according to FIG. 1 is reproduced in FIG. 2 in a pseudocode representation with load instructions using base register-relative addressing as an example. In this and all the following figures, the instructions in the program code of the original processors that are to be converted are listed at the left. Program code sections for the original processor, also referred to below as program blocks, are furnished with a reference number beginning with "U." The respective program code transformed for the target processor is shown on the right side. Reference numbers beginning with "Z" are used to label program blocks for the target processor, with corresponding sections for the original and the target processor having reference numbers with the same digit sequence. In the illustrated examples, it is assumed that a transfer of the contents of the register R in the original processor into a register r of the target processor has already taken place.

The program code section Z21 is generated for the target processor to convert a first base register-relative load instruction U21 in the original program code. The load instruction U21 (ld—load) relates to the memory contents at an address that is specified by the contents of the base register R and the offset $D_1$. As indicated by the brackets, the address is calculated as an effective address, with the width of the cyclical address space being n bits.

In the program code section Z21 for the target processor, a register $r_p$ in the target processor is first loaded with the value $[D_1+r]$ (lea—load effective address). By this special load instruction, the sum of $D_1$ and the contents of r is determined as the effective address, i.e., as the address in the cyclical address space of width m in the target processor.

In the subsequent instruction (and—logical AND operation), the modulo $2^n$ operation from step S4 of FIG. 1 is implemented by bitwise logical AND, by setting all bits with a higher order than the nth bit in the register to zero.

In the last instruction of the program code section Z21, a register $r_1$ is finally loaded with the memory contents at the address stored in the register $r_p$.

In the original code there is subsequently a second base register-relative load instruction U22. In the corresponding program code section Z22 for the target processor, a base register-relative load instruction is generated analogously to steps S7 and S8 of FIG. 1, relative to the base register $r_p$ and with an offset $D_2-D_1$. If there is no possibility in the program code for the target processor of performing a difference calculation immediately inside the load instruction, a second register can be used, in which the difference $D_2-D_1$ is first interim-stored, to be subsequently transferred to the load instruction as an operand. Compared to the conversion of the first load instruction in the program code section Z21, the instruction for the modulo $2^n$ operation is saved in section Z22 in every case.

Figure 3:
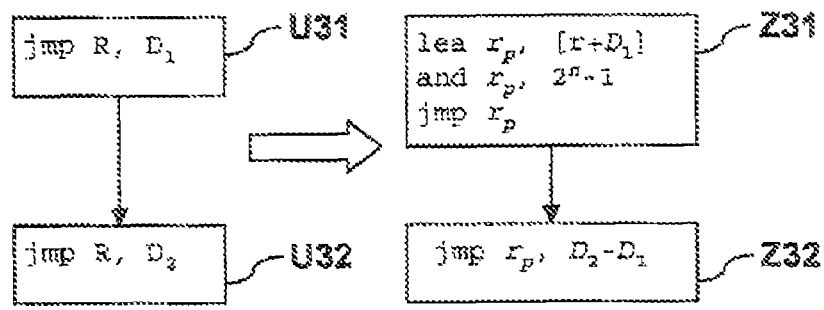
FIGS. 3-8 show additional examples of methods for converting base register-relative instructions in a pseudocode representation.

FIG. 3 shows an analogous example with base register-relative jump instructions instead of load instructions.

The program code sections Z31 and Z32 are generated for the target processor to convert two base register-relative jump instructions U31 and U32 in the original program code. The jump instruction in U31 and U32 (jmp—jump) relates to the base register R and the distance values $D_1$ and $D_2$.

In the program code section Z31 for the target processor, the jump address of the first jump instruction in the address space of the target processor is first determined semantically correctly (i.e., projected onto the address space of the original processor) in a register $r_p$ and then the first jump to this address is executed. The second jump can be executed using the first jump address as a base register value and an offset of $D_2-D_1$, whereby the modulo operation necessary for a direct semantically correct conversion can again be saved for the second instruction.

The previously presented examples related to linear program sequences. For example, the program sections U22 and U32 of FIGS. 2 and 3, respectively, are necessarily preceded by the program section U21. Correspondingly, the program sections Z21 and Z31 are just as certainly executed before the corresponding program sections Z22 and Z32, whereby it is ensured that the register $r_p$ is set to the correct value, namely the address related to the first load or jump instruction. The subsequent examples deal with cases having program branching, for which this is no longer necessarily the case.

Figure 4:
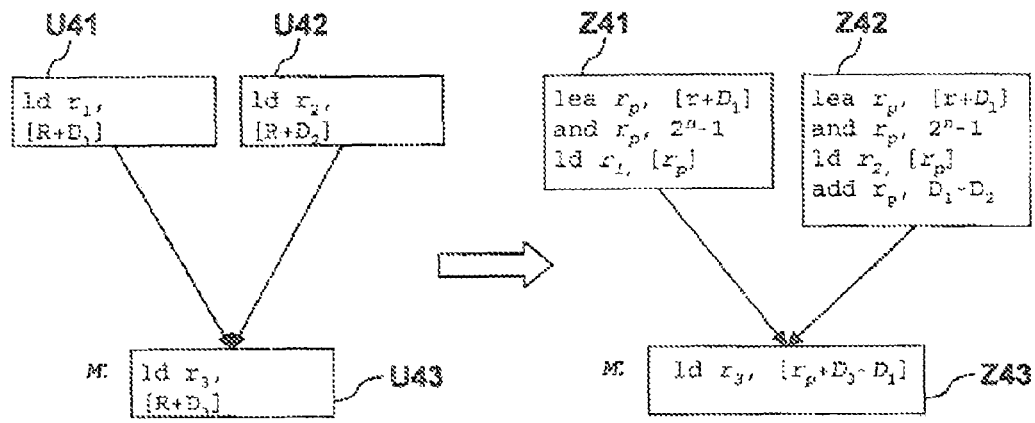

In the method for converting base register-relative load commands illustrated in pseudocode in FIG. 4, two alternatively executed program blocks U41 and U42 are provided in the program code for the original processor, from each of which there is a jump after the load instructions to a jump target M, whereupon a third program block U43 is executed. A third load command is to be executed in the third program block U43. The third load command is not necessarily located in the program code at exactly the address of the jump target M, it can be positioned later in the program block U43—but not after another program branch.

All load instructions relate to the register R as the base register. The first load instruction in the program block U41 has the offset $D_1$, the second instruction in the program block U42 has the offset $D_2$ and the third instruction in the program block U43 has the offset $D_3$.

For the conversion of the first program block U41 into a program block Z41, the load address is calculated semantically correctly taking into account the size of the address in the original processor, analogously to the conversion of the program block U21 into program block Z21, and is stored in the register $r_p$. The conversion of the third load command in the program block U43, which also relates to the base register R and has an offset $D_3$, accordingly runs analogously to the conversion of the program block U22 into the program block Z22 in FIG. 2.

To convert the second load instruction in the program block Z42, it is taken into consideration that the assumption in the converted program block U43 is that the offset $D_1$ of the first load instruction from program block U41 has already been input into the register $r_p$. Before the jump to the jump target M, the register $r_p$ must consequently be set such that it would be set in case of a jump from the program block Z41. The third load instruction in the program block Z43 is then calculated correctly in every case, independently of the place (Z41 or Z42) from which the program reached the program block Z43. This is achieved by virtue of the fact that the load address of the second load instruction is first determined semantically correctly in the register $r_p$ and the corresponding load instruction is executed into the register $r_1$. Before the jump to the jump target M is then executed, the register $r_p$ is corrected by the difference of the jump length $D_1-D_2$ by means of an add instruction.

Thus the address for the third load instruction in the program block Z43 is calculated as: $r_p+D_3-D_1$. Here, $r_p=(r+D_2)+(D_1-D_2)$, wherein the value in the first parentheses follows from the first load instruction of the program block Z42 (lea . . . ) and the value of the second parentheses derives from the fourth instruction (add . . . ). If this is inserted, the result is the jump address: $r_p+D_3-D_1=(r+D_2)+(D_1-D_2)+D_3-D_1=r+D_3$, which is precisely the target address of the third jump.

By adopting the address in the register $r_p$ and correcting it, two additional instructions are necessary in the program block Z42, but in return, the simplified conversion of the load instruction in the third program block U43 becomes possible, in which the time-intensive instructions are avoided. This applies particularly if the load instruction in U43 is executed multiple times, as in a program loop, for example.

Figure 5:
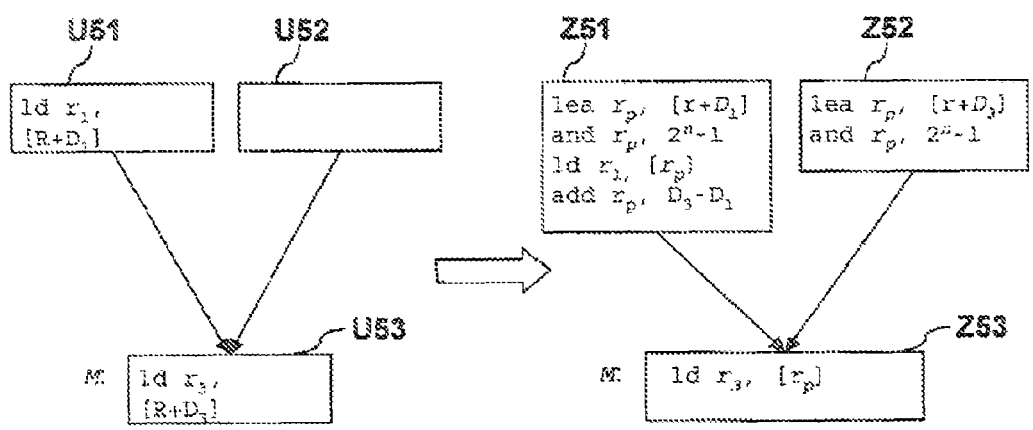

FIG. 5 shows a situation relative to the program branching that is analogous to FIG. 4. There is a jump from each of two program blocks U51 and U52 to a common jump target M in a third program block U53. Unlike the example of FIG. 4, base register-relative load instructions are only present in the program blocks U51 and U53, but not in the program block U52.

There is a jump to the jump target M in both cases, i.e., from the program blocks Z51 and Z52, so that the distance $D_3$ relative to the base register r is already present in the register $r_p$. The target address of the load instruction to be executed in the target code section Z53 is thus determined in advance, and the third load instruction is executed as a load instruction with a predetermined absolute address $r_p$.

To guarantee this, the semantically correct conversion of the first load address in the register $r_p$ is performed in the program block Z51, and the corresponding load instruction for loading a first register is executed. Before the jump to the jump target M, the content of the register $r_p$ is corrected by the difference of the jump length, $D_3-D_1$, by means of an add instruction. Thus the calculation of the address for the load instruction according to program block Z43 of FIG. 4 is, in a sense, anticipated.

In addition, the load address of the offset $D_3$ for the load instruction from program block U53 is determined semantically correctly in the program block Z52 before the jump to the jump target M is executed, and is stored in the register $r_p$.

Compared to a conventional direct semantically correct conversion of the load instructions from program blocks U51 and U53, no instructions are saved on the way from Z52 to Z53 in the conversion presented here, but they are saved on the way from Z51 to Z53. The savings are analogous to those on the path from Z42 to Z43 in the example of FIG. 4.

FIG. 6 shows, again in pseudocode, a conversion of base register-relative load instructions in a program sequence in which an additional program branch takes place after the jump target M has been reached.

As in the example of FIG. 5, there is a jump (or a program continuation) from two alternatively executable program blocks U61 and U62 to a common jump target M in a third program block U63, wherein a base register-relative load instruction with offset $D_1$ is to be executed only in one program path, in program block U61.

A program branch is provided in the third program block U63, either to a fourth program block U64 or to a fifth program block U65. Each of these blocks has a base register-relative load instruction, with the respective distance values $D_4$ and $D_5$.

The conversion is done in principle according to the same pattern as the conversion in the example of FIG. 5. Already in the jump to the target M, the offset of one of the additional load instructions, that of the load instruction in the program section U64 with the offset $D_4$ in the present example, is taken into account in the register $r_p$. The conversion into the target code sections Z61, Z62 and Z64 is thus exactly analogous to those in the blocks Z51, Z52 and Z53 of the example from FIG. 5. Correspondingly, there are advantages of this conversion in comparison to a conventional conversion only on the path that starts from the program block Z61. The load address in the target code section Z65 is likewise converted conventionally via a semantically correct transformation, for which reason there is no advantage at all on a path that goes to the program code section Z65. Thus, only one path, namely that from program block Z61 to program block Z64, profits in this example.

Figure 6:
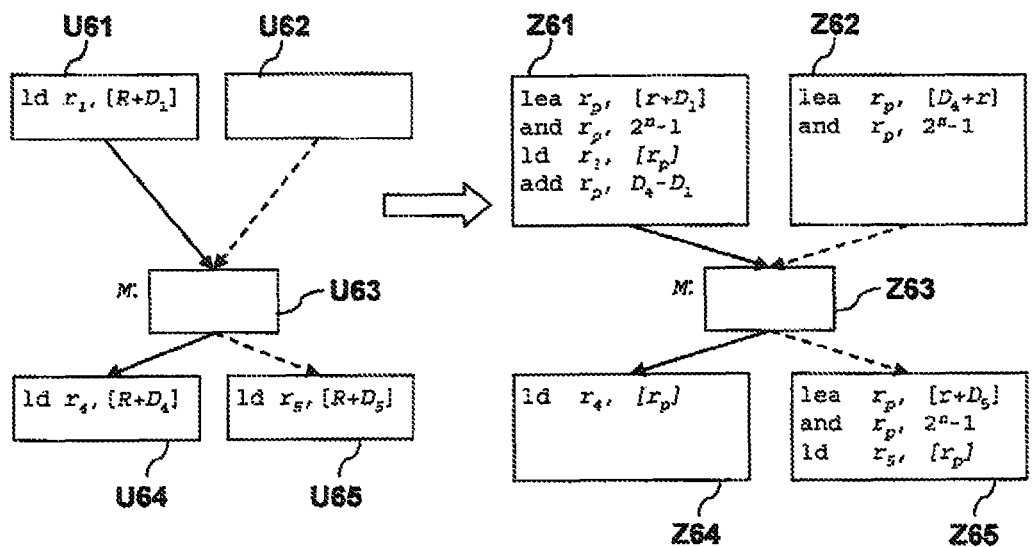

In an emulation of a complex program, however, it is familiar and customary to perform program flow analyses to determine or estimate the relative frequencies with which different paths are taken at runtime of a program. The ascertained relative frequencies can be provided to an emulator, so that precisely the most commonly taken paths are optimized by the previously described method. In the example of FIG. 6 therefore, precisely the more frequently executed of the two program blocks Z64 or Z65 is optimized in such a manner that the conversion of the load instruction can be executed by a single instruction (as in block Z64 here).

In principle, known program flow analyses can also be used to be able to distinguish different situations in the program flow.

Figure 7:
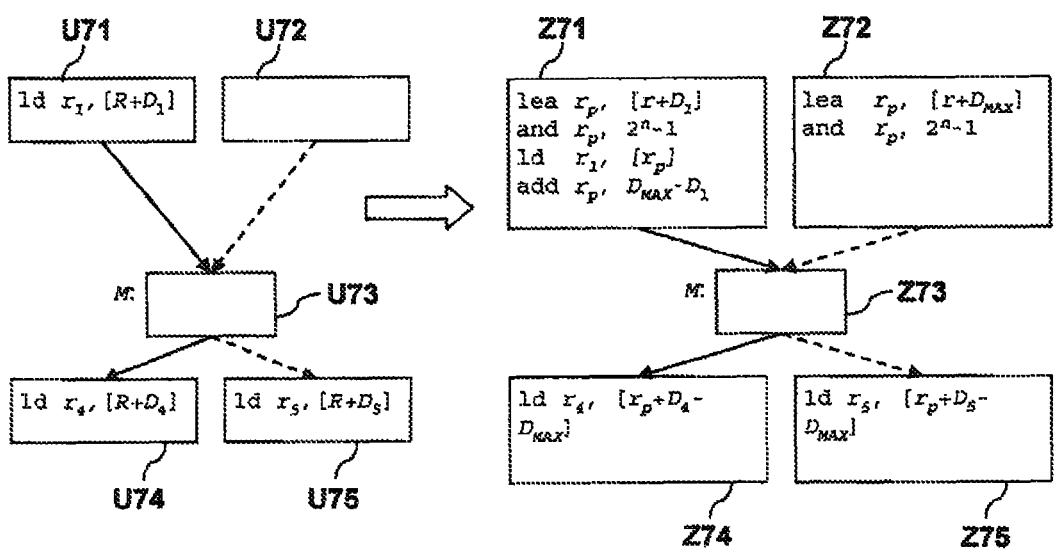

FIG. 7 shows an alternative example of the method for the same starting situation with respect to the original program code as for the example of FIG. 6.

Unlike the example of FIG. 6, it is not the offset of one of the additional load instructions that is taken into account in the register $r_p$ for the jump to the target M, but instead a maximum offset $D_{MAX}$=max−min, where min and max represent the limits of the allowed value range for distance values in the original processor. The program blocks Z71 and Z72 thus correspond exactly to the blocks Z61 and Z62, with only the offset $D_4$ being replaced by the maximum offset $D_{MAX}$.

In the program blocks Z74 and Z75, there can then be a determination of the load address in both cases for the respective distance values $D_4$ and $D_5$ with $r_p$ as the base register.

If a wraparound can occur for a given content of the base register during a conversion, then it certainly will occur if the maximum offset $D_{MAX}$ is assumed. The anticipation of this case in the program block Z72 thus ensures the correct address determination in both subsequent program blocks Z74 and Z75. In the example of FIG. 6, this was provided only for the subsequent block Z64 that was processed in block Z62, which is why there had to be a complete semantically correct address determination in block Z65. Compared to the example of FIG. 6, savings are achieved not only on the path Z71→Z74 but also on the path Z71→Z75.

A procedure analogous to this example, in which the maximum offset $D_{MAX}$ is fundamentally used for determining the projected address in the retained register $r_p$, is not limited to the program sequence shown in FIGS. 6 and 7, but can be realized in all conceivable program sequences, in particular also in connection with the examples shown in FIGS. 2-5.

Figure 8:
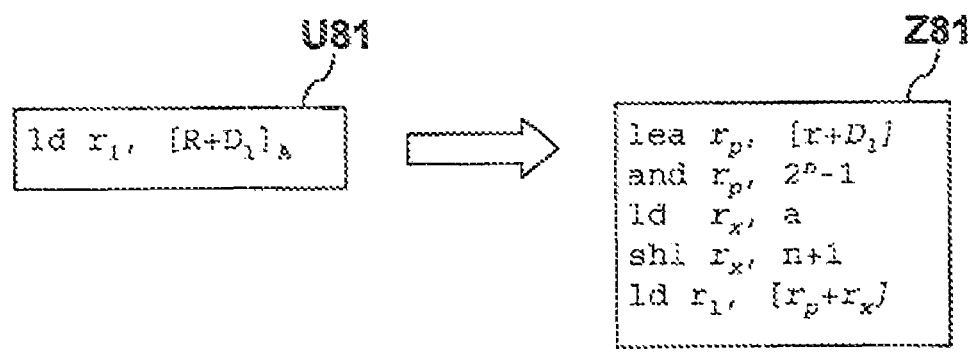

Another configuration relates to programs that use several address spaces simultaneously. Such a usage of several address spaces is possible, for example, with the already mentioned S/390 processors from IBM. For each base register R in this case, there is an address space selection register (access register) A, the content of which contains an identifier of the address space to be selected. On the left side in FIG. 8, a base register-relative load instruction with the base register R, the offset $D_1$ and the access register A are shown in a program block U81 for the original processor.

If address spaces used in parallel are not known on the target processor, but instead it has a single sufficiently large address space (for example with 64-bit long addresses, i.e., m=64), then the load instruction can be converted for the target processor as shown in the program block Z81.

The first two instructions in the program code block Z81 for the target processor are used to determine a projected address in the register $r_p$, just as in the program code block Z21 of FIG. 2, for example. The extra inserted instruction following these two loads the content of a register a, in which the access register A for the emulation is tracked, into a register $r_x$. The subsequent example (shl $r_x$, n+1−shift left) shifts the (binary) content of the register $r_x$ to the left by (n+1) bits. This corresponds to the adding of ($a*2^{n+1}$) to the primitive effective address, which does not consider address spaces. The base register-relative load instruction is then converted with $r_p$ as the base register and $r_x$ as the offset. The individual parallel address spaces of the additional processor are thus mapped into separated ranges of the address space for the target processor. In the addresses on the target processor, they occupy positions (bits) side by side of different orders.

If each of these address spaces is restricted on its own right, so that only the addresses in the range $a*2^{n+1} \ldots a*2^{n+1}+2^n-1-(max-min)$ are respectively permissible, and if the address identifiers (optionally compactly encoded in a) are limited, so that $0<a*2^{n+1}<2^m-(max-min)$, then all the previous considerations also apply to the address spaces differentiated by the content of A. The instructions that can be saved with the method according to the application in the translation of a second base register-relative jump following the first base register-relative jump then also include the ld and shl instructions, so that a total of 4 instructions can be saved.

Although the methods have been described in connection with specific forms thereof, it will be appreciated that a wide variety of equivalents may be substituted for the specified elements described herein without departing from the spirit and scope of this disclosure as described in the appended claims.

The invention claimed is:

1. A method for converting at least two instructions with base register-relative addressing in an emulation of a program code created for an original processor into a program code for a target processor,
wherein
the original processor uses addresses with a length of n bits in a cyclical address space,
the target processor uses addresses with a length of m bits, where m is greater than n,
the target processor allows a base register-relative addressing with distance values that lie between a lower value (min) and an upper value (max),
and
the supported address space on the original processor for the code to be emulated is limited in such a manner that the conversion of address operands as described in the following steps leads to semantically equivalent behavior on the target processor comprising:

converting a first instruction for the original processor with an address operand that results from a first offset ($D_1$) relative to a base register (R), by:
- determining a projected address on the target processor by forming the sum of the content of the base register (R) and an offset (D) that is greater than or equal to the first offset ($D_1$) and less than the difference (max−min), and
- projecting the sum onto a cyclical address space with addresses having a length of n bits, determining a first address on the target processor as the sum of the projected address and the first offset ($D_1$), minus the offset (D) and executing a converted first instruction on the target processor with the first address as the address operand; and converting a second instruction for the original processor with an address operand that results from a second offset ($D_2$) relative to a base register (R), by:
- determining a second address on the target processor as the sum of the projected address and the second offset ($D_2$), minus the offset (D) and
- executing a converted second instruction on the target processor with the second address as the address operand.

2. The method according to claim 1, wherein the address space supported for the emulated program code in the original processor is limited by convention.

3. The method according to claim 1, wherein the address space supported for the emulated program code in the original processor is limited with the aid of a system program.

4. The method according to claim 1, wherein the supported address space is limited to an address range between the address 0 and the address $2^n-1-(max-min)$.

5. The method according to claim 1, wherein the offset ($D_1$) is used and in which the first address is equal to the projected address.

6. The method according to claim 1, wherein the difference (max−min) is used as the offset (D).

7. The method according to claim 1, wherein the projected address is retained in a register ($r_p$) of the target processor and at least one of the converted instructions with base register-relative addressing on the target processor is an instruction with base register-relative addressing relative to the register ($r_p$) as the base register.

8. The method according to claim 1, wherein the calculation of the second address already takes place as part of the conversion of the first instruction.

9. The method according to claim 1, wherein a third and, optionally, additional instructions with base register-relative addressing for the original processor are converted analogously to the second instruction.

10. The method according to claim 1, wherein parallel address spaces of the original processor are mapped onto separated address spaces in the address space of the target processor.

11. The method according to claim 10, wherein
each of the parallel address spaces is itself limited,
the address space on the original processor is selected via the contents of an access register (A), and
the content of an emulated access register (a) is linked to the address projected.

12. A program for emulation of a program created for an original processor on a target processor that performs a method according to claim 1 while running on the target processor.

* * * * *